(12) United States Patent  
Yamamoto (10) Patent No.: US 9,897,274 B2  
(45) Date of Patent: Feb. 20, 2018

(54) VEHICLE LAMP

(71) Applicant: KOITO MANUFACTURING CO., LTD., Tokyo (JP)

(72) Inventor: Ippei Yamamoto, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 15/372,806

(22) Filed: Dec. 8, 2016

(65) Prior Publication Data

US 2017/0159902 A1  Jun. 8, 2017

(30) Foreign Application Priority Data

Dec. 8, 2015  (JP) .................................. 2015-239219

(51) Int. Cl.
  *F21V 7/00*  (2006.01)
  *F21S 8/10*  (2006.01)
  *B60Q 1/00*  (2006.01)

(52) U.S. Cl.
  CPC ........ *F21S 48/1705* (2013.01); *B60Q 1/0058* (2013.01); *F21S 48/1159* (2013.01); *F21S 48/137* (2013.01); *F21S 48/1317* (2013.01); *F21S 48/1388* (2013.01); *F21S 48/145* (2013.01); *F21S 48/1747* (2013.01); *F21S 48/1752* (2013.01)

(58) Field of Classification Search
  CPC ................ B60Q 1/0058; F21S 48/1705; F21S 48/1747; F21S 48/1159; F21S 48/1317; F21S 48/137
  See application file for complete search history.

(56) References Cited

U.S. PATENT DOCUMENTS

| 7,311,430 | B2 * | 12/2007 | Tsukamoto | F21S 48/1159 362/517 |
| 2004/0008521 | A1 * | 1/2004 | Nakajima | B60Q 1/0041 362/544 |
| 2008/0232122 | A1 * | 9/2008 | Ota | B60Q 1/0058 362/473 |
| 2015/0062948 | A1 | 3/2015 | Otsubo | |

FOREIGN PATENT DOCUMENTS

JP         2015050173 A      3/2015

* cited by examiner

*Primary Examiner* — Sean Gramling  
(74) *Attorney, Agent, or Firm* — Osha Liang LLP (57) ABSTRACT

A vehicle lamp includes a first light source, a first reflector which reflects light emitted from the first light source to form a low beam light distribution pattern, a second light source, a second reflector which reflects light emitted from the second light source to form a high beam additional light distribution pattern and includes a short distance reflection surface provided at a closer position and a long distance reflection surface provided at a farther position with respect to the second light source at a predetermined interval therebetween, a third light source, and a third reflector which is arranged at the back side of the second reflector and reflects light emitted from the third light source through a gap between the short distance reflection surface and the long distance reflection surface. The third light source is configured to be lit in a low beam irradiation mode.

5 Claims, 6 Drawing Sheets

VEHICLE LAMP

CROSS-REFERENCE TO RELATED APPLICATIONS

The present application claims the benefit of priority of Japanese Patent Application No. 2015-239219, filed on Dec. 8, 2015, the content of which is incorporated herein by reference.

TECHNICAL HELD

The present invention relates to a vehicle lamp which is configured to selectively perform low beam irradiation and high beam irradiation.

BACKGROUND

There has been known a vehicle lamp which is configured such that light from light sources is reflected towards a front of a vehicle by reflectors, so as to selectively perform low beam irradiation and high beam irradiation.

JP-A-2015-50173 discloses a vehicle lamp which is configured such that nine sets of light sources and reflectors are arranged in a vehicle width direction.

In the configuration of the vehicle lamp disclosed in JP-A-2015-50173, a low beam light distribution pattern is formed by simultaneously lighting six sets out of the nine sets of light sources in a low beam irradiation mode, and a high beam light distribution pattern is formed by additionally lighting the remaining three sets of light sources in a high beam irradiation mode.

That is, in this vehicle lamp, a high beam additional light distribution pattern is formed by the three sets of light sources and reflectors.

In the vehicle lamp disclosed in JP-A-2015-50173, all the nine sets of light sources are lit in the high beam irradiation mode, and reflection surfaces of all the nine sets of reflectors appear to emit light. However, the three sets of light sources for the high beam are not lit in the low beam irradiation mode, and thus the reflection surfaces of three sets of reflectors are dark.

Thus, from the viewpoint that presence of the vehicle is sufficiently recognized in surroundings at night driving, it is desired that a light emitting region is enlarged even in the low beam irradiation mode, so that the visibility is improved.

SUMMARY

The present invention has been made in view of the above-described circumstances, and an object of the present invention is to provide a vehicle lamp which is configured to selectively perform low beam irradiation and the high beam irradiation by reflecting light from light sources towards a front of a vehicle by reflectors and can improve visibility in a low beam irradiation mode.

The present invention achieves the above object by providing a new light source and a reflector while devising a shape of a high beam reflector.

According to an embodiment of the present invention, there is provided a vehicle lamp configured such that light emitted from a first light source is reflected by a first reflector towards a front of a vehicle to form a low beam light distribution pattern and light emitted from a second light source is reflected by a second reflector towards the front of the vehicle to form a high beam additional light distribution pattern. The second reflector includes a short distance reflection surface provided at a closer position and a long distance reflection surface provided at a farther position with respect to the second light source at a predetermined interval therebetween, a third light source and a third reflector are arranged at a back side of the second reflector, the third reflector being configured to reflect light emitted from the third light source towards the front of the vehicle through a gap between the short distance reflection surface and the long distance reflection surface, and the third light source is configured to be lit in a low beam irradiation mode.

The types of the "first light source", "second light source" and "third light source" are not particularly limited. For example, a light source bulb, or light emitting elements such as a light emitting diode and a laser diode may be adopted.

As long as the "second reflector" includes the short distance reflection surface provided at the closer position and the long distance reflection surface provided at the farther position with respect to the second light source at the predetermined interval, the specific positional relation and the specific size of the "gap" between the "short distance reflection surface" and the "long distance reflection surface" are not particularly limited.

The number of the "first light source" and the "first reflector", the number of the "second light source" and the "second reflector", and the number of the "third light source" and the "third reflector" are not particularly limited.

The "third light source" is lit in the low beam irradiation mode, however, as long as the gap between the short distance reflection surface and the long distance reflection surface appears to emit light by the reflection light from the third reflector, the specific light distribution pattern may not be formed by the lighting of the third light source. However, the specific light distribution pattern may form the light distribution pattern for a clearance lamp, or the light distribution pattern strengthening the brightness of the low beam light distribution pattern.

Effect of the Invention

According to the above configuration, the vehicle lamp is configured to form the low beam light distribution pattern by the first light source and the first reflector and form the high beam additional light distribution pattern by the second light source and the second reflector. The second reflector for a high beam includes the short distance reflection surface provided at the closer position and the long distance reflection surface provided at the farther position with respect to the second light source at the predetermined interval therebetween, and the third light source and third reflector are arranged at a back side of the second reflector. The third reflector reflects the light emitted from the third light source towards the front of the vehicle through the gap between the short distance reflection surface and the long distance reflection surface, and the third light source is configured to be lit in the low beam irradiation mode. Accordingly, the following effects can be obtained.

That is, when the third light source is lit in the low beam irradiation mode, the gap between the short distance reflection surface and the long distance reflection surface of the second reflector for a high beam can appear to emit light by the reflection light from the third reflector, so that the visibility of the vehicle lamp can be improved.

Accordingly, light from the light source is reflected towards the front of the vehicle by reflectors, so as to selectively perform the low beam irradiation and the high beam irradiation and improve the visibility in the low beam irradiation mode.

Further, when the second light source is lit, the gap between the short distance reflection surface provided at the closer position and the long distance reflection surface provided at the farther position of the second reflector appears to emit light at the predetermined interval therebetween, so that the visibility of the vehicle lamp in the high beam irradiation mode will not be damaged.

In this configuration, if the third reflector is configured such that the reflection surface thereof reflects the light emitted from the third light source as converged light towards the gap, the utilization efficiency of irradiation light from the third light source and the third reflector can be improved without requiring expansion of the gap.

In the above configuration, in a case where the second reflector is arranged on the upper side or the lower side of the second light source, if each of the short distance reflection surface and the long distance reflection surface has a vertical sectional shape formed based on a parabola as a reference line, the expanding of the reflection light respectively from the short distance reflection surface and the long distance reflection surface in the vertical direction can be suppressed to be smaller, so that it is possible to prevent a vertical width of the high beam additional light distribution pattern from being too large.

Meanwhile, if a focal distance of the parabola configuring the reference line of the vertical sectional shape of the long distance reflection surface is set to be larger than the focal distance of the parabola configuring the reference line of the vertical sectional shape of the short distance reflection surface, even though a gap is formed between the short distance reflection surface and the long distance reflection surface, the light from the second light source can hardly reach the gap, but reach the short distance reflection surface or the long distance reflection surface easily.

In this case, if multiple sets of the second light source and the second reflector are arranged in the vehicle width direction, a brighter high beam additional light distribution pattern with less light distribution unevenness can be formed. Further, when multiple sets of the third light source and the third reflector are arranged in the vehicle width direction, the gap between the short distance reflection surface and the long distance reflection surface of each of the second reflector can emit light substantially uniformly.

If the second light sources and the third light sources are all configured by light emitting elements and are mounted on a same substrate, they can be arranged in a smaller space with better precision.

If multiple sets of the first light source and the first reflector are also arranged in the vehicle width direction, a brighter low beam light distribution pattern with less light distribution unevenness can be formed. Further, if the first light sources are also configured by light emitting elements and are mounted on the same substrate with that of the second light sources and the third light sources, all the light sources can be arranged in a smaller space with better precision.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 4A and 4B are views showing light distribution patterns formed by irradiation light from the vehicle lamp, where

FIGS. 5A and 5B are front views showing the vehicle lamp in a lighting state, where

DETAILED DESCRIPTION

Hereinafter, embodiments of the present invention will be described while referring to the drawings.

Figure 1:
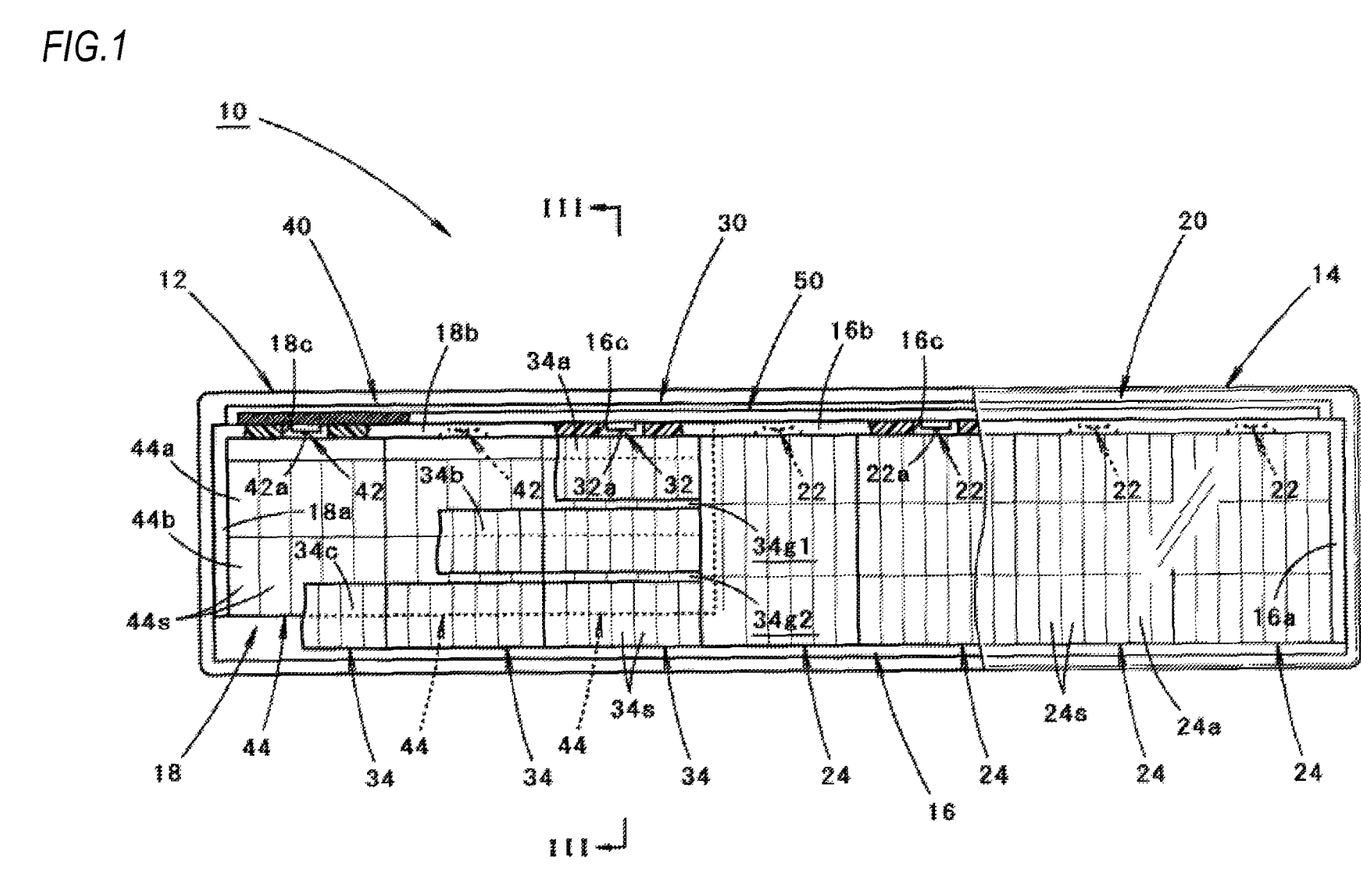
FIG. 1 is a front partial sectional view showing a vehicle lamp according to an embodiment of the present invention.
Figure 2:
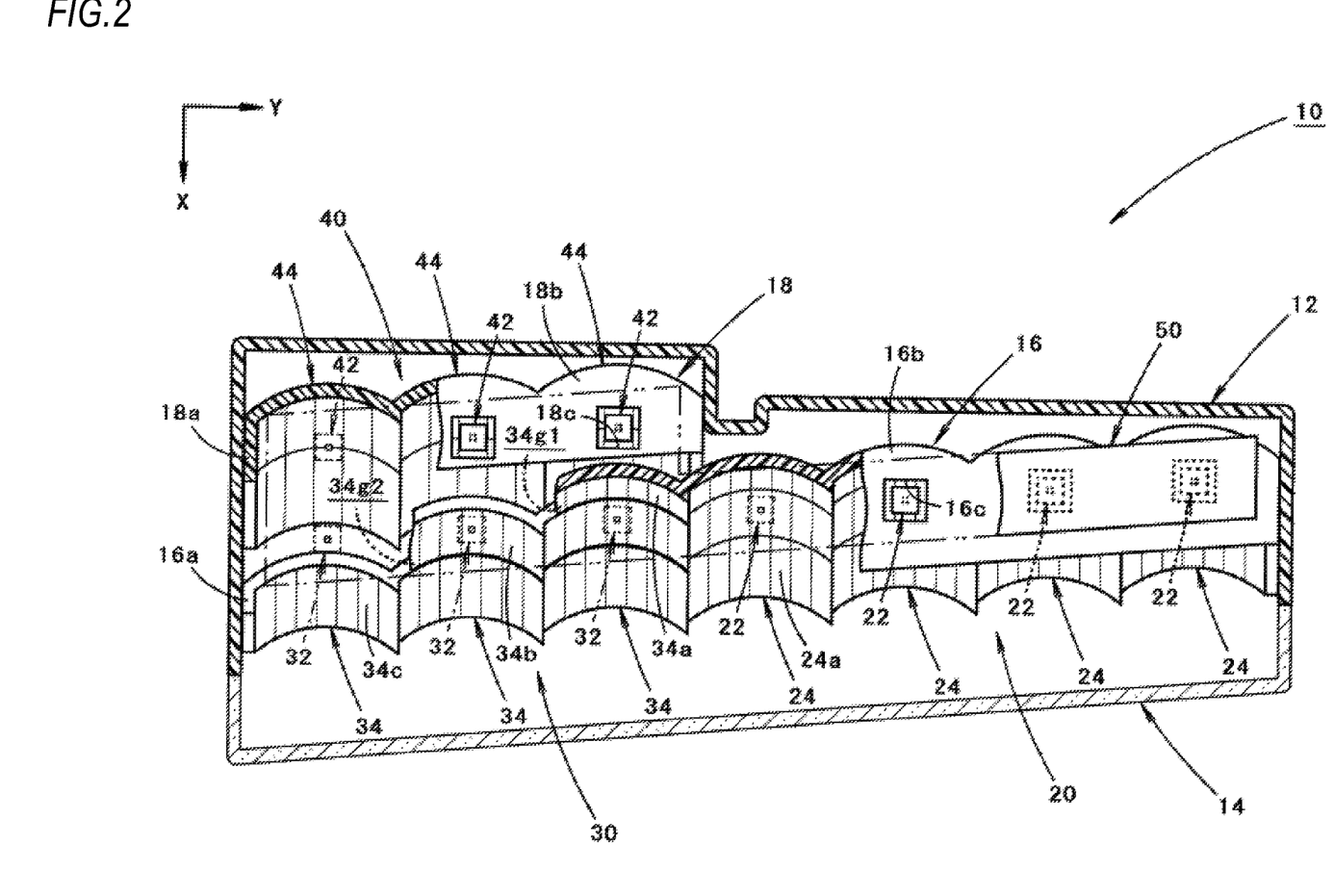
FIG. 2 is a partial plan sectional view showing the vehicle lamp.
Figure 3:
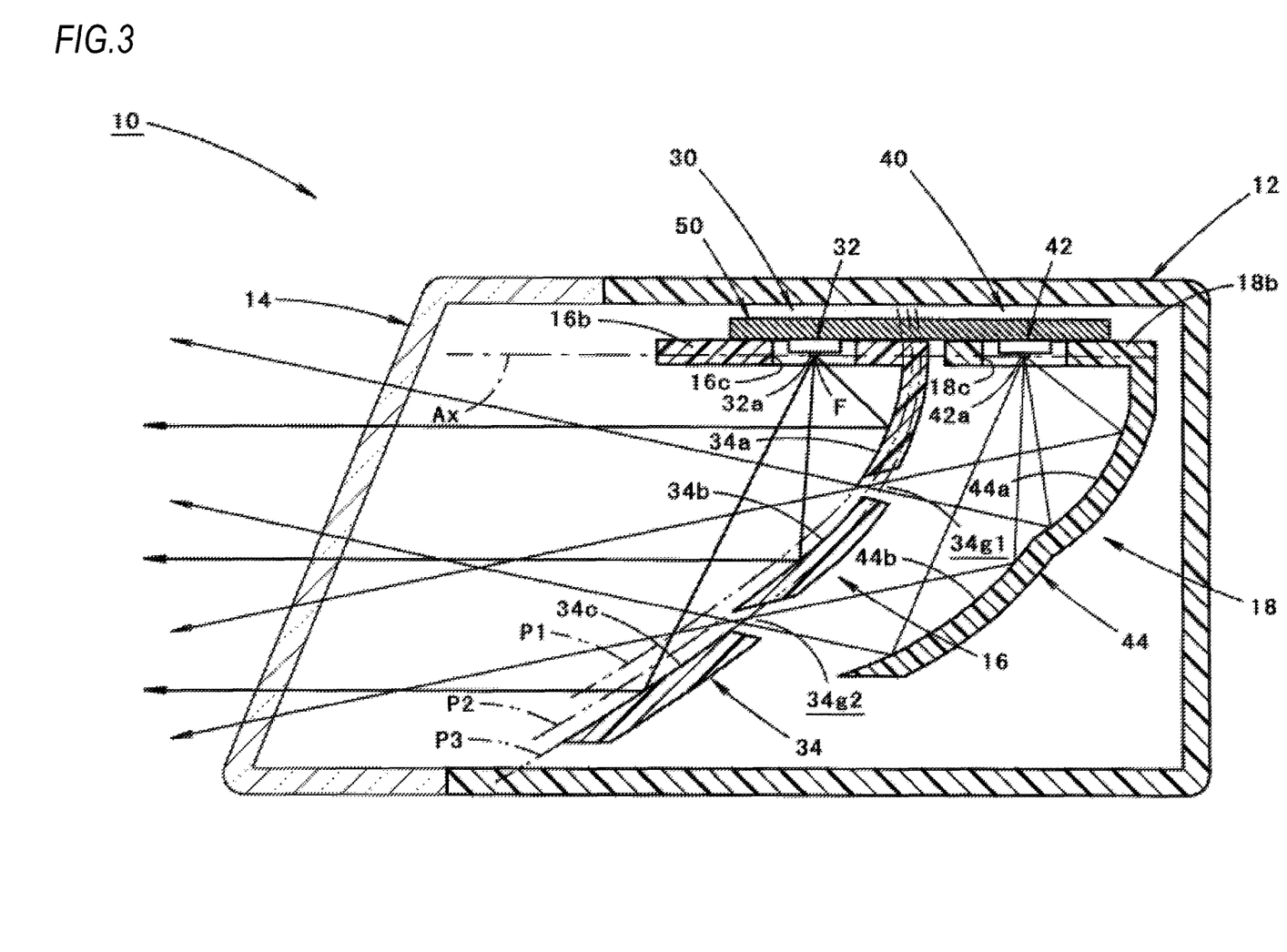
FIG. 3 is a sectional view along the line III-III in FIG. 1.

FIG. 1 is a front partial sectional view showing a vehicle lamp 10 according to an embodiment of the present invention, and FIG. 2 is a partial plan sectional view of the vehicle lamp 10. FIG. 3 is a sectional view along the line III-III in FIG. 1.

As shown in these drawings, the vehicle lamp 10 according to the present embodiment is a head lamp which is arranged on a front left end of a vehicle and is configured to selectively perform low beam irradiation and high beam irradiation.

In FIG. 2, for the vehicle lamp 10, the direction represented by X is a "front side" (same as the vehicle), and the direction represented by Y is a "left side" (same as the vehicle, but is a "right side" in a front view of the vehicle lamp) orthogonal to the "front side".

The vehicle lamp 10 includes a light chamber formed by a lamp body 12 and a transparent cover 14 provided at an opening portion of a front side of the lamp body 12, a first lamp unit 20 used for forming a low beam light distribution pattern, a second lamp unit 30 used for forming a high beam light distribution pattern, and a third lamp unit 40 used for improving visibility in a low beam irradiation mode which are provided in the light chamber.

First, the configuration of the first lamp unit 20 will be described.

The first lamp unit 20 includes four first light sources 22 and four first reflectors 24 which reflect light emitted respectively from the four first light sources 22 towards the front of the vehicle.

The four first light sources 22 are arranged at equal intervals in the vehicle width direction such that the closer they are to the vehicle width outer side, the more they are slightly displaced in the back side. The four first light sources 22 have the same configuration.

Each of the first light sources 22 is a light emitting element (specifically, a white light emitting diode) having a light emitting surface 22a with a rectangular shape (e.g., square) and is mounted on a common substrate 50 such that the light emitting surface 22a faces downward.

The four first reflectors 24 are arranged in parallel on the lower side of each of the four first light sources 22 in the vehicle width direction such that the closer they are to the vehicle width outer side, the more they are slightly displaced in the back side.

Each of the first reflectors 24 has the same outer shape in the front view of the vehicle lamp, and a reflection surface 24a thereof is configured by a plurality of reflection elements 24s. The plurality of reflection elements 24s have a vertical sectional shape which is slightly deformed from a parabola with a focal point located near the front of the reflection surface 22a and control the light emitted from the first light source 22 to be reflected towards the front of the vehicle.

Next, the configuration of the second lamp unit 30 will be described.

The second lamp unit 30 is arranged adjacent to the first lamp unit 20 in the vehicle width inner side.

The second lamp unit 30 includes three second light sources 32 and three second reflectors 34 which reflect light emitted respectively from the three second light sources 32 towards the front of the vehicle.

The three second light sources 32 are arranged at equal intervals in the vehicle width direction such that the closer they are to the vehicle width outer side, the more they are slightly displaced in the back side. The three second light sources 32 have the same configuration.

Each of the three second light sources 32 is a light emitting element (specifically, a white light emitting diode) having a light emitting surface 32a with a rectangular shape (e.g., square) and is mounted on the substrate 50 common with the four first light sources 22 such that the light emitting surface 32a faces downward.

The three second reflectors 34 are arranged in parallel on the lower side of each of the three second light sources 32 in the vehicle width direction such that the closer they are to the vehicle width outer side, the more they are slightly displaced in the back side. Each of the three second reflectors 34 has the same outer shape in the front view of the vehicle lamp.

Each of the second reflectors 34 includes a short distance reflection surface 34a provided at a closer position, a long distance reflection surface 34b provided at a farther position, and a farthest distance reflection surface 34c provided at a farthest position with respect to the corresponding second light source 32 at predetermined intervals. Each of the short distance reflection surface 34a, the long distance reflection surface 34b, and the farthest distance reflection surface 34c is configured by a plurality of reflection elements 34s. The plurality of reflection elements 34s control the light emitted from the second light sources 32 to be reflected towards the front of the vehicle.

Further, a band-shaped gap 34g1 extending along the vehicle width direction is formed between the short distance reflection surface 34a located at an upper section and the long distance reflection surface 34b located at a middle section, and a band-shaped gap 34g2 extending along the vehicle width direction is formed between the long distance reflection surface 34b located at the middle section and the farthest distance reflection surface 34c located at a lower section.

Each of the gaps 34g1 and the gaps 34g2 is formed continuously at a constant vertical width across the three second reflectors 34. The vertical width of the each of the gaps 34g1 and the gaps 34g2 is set to be less than ¼ (for example, about ⅕) of each of the vertical widths of the short distance reflection surface 34a, the long distance reflection surface 34b, and the farthest distance reflection surface 34c.

As shown in FIG. 3, in each of the second reflectors 34, the short distance reflection surface 34a has a vertical sectional shape formed based on a parabola P1 as a reference line, the long distance reflection surface 34h has a vertical sectional shape formed based on a parabola P2 as a reference line, and the farthest distance reflection surface 34c has a vertical sectional shape formed based on a parabola P3 as a reference line.

The parabola P1 has a focal point F at a light emitting center of the light emitting surface 32a on an axis Ax extending in the vehicle front-rear direction and passing through the light emitting center of the light emitting surface 32a of the second light source 32. The plurality of reflection elements 34s configuring the short distance reflection surface 34a have a vertical sectional shape which is slightly deformed from the parabola P1 so as to reflect the light emitted from the second light sources 32 towards the front of the vehicle in a substantially horizontal direction.

The parabola P2 also has the focal point F described above, but a focal distance thereof is set to be greater than that of the parabola P1. The plurality of reflection elements 34s configuring the long distance reflection surface 34b have a vertical sectional shape which is slightly deformed from the parabola P2 so as to reflect the light emitted from the second light sources 32 towards the front of the vehicle in the substantially horizontal direction.

The parabola P3 also has the focal point F described above, but a focal distance thereof is set to be greater than that of the parabola P2. The plurality of reflection elements 34s configuring the furthest distance reflection surface 34c have a vertical sectional shape which is slightly deformed from the parabola P3 so as to reflect the light emitted from the second light sources 32 towards the front of the vehicle in the substantially horizontal direction.

The upper end of the long distance reflection surface 34b is formed substantially directly below the lower end of the short distance reflection surface 34a. The upper end of the farthest distance reflection surface 34c is formed substantially directly below the lower end of the long distance reflection surface 34b, so that the light from the second light sources 32 hardly reaches the gaps 34g1 and gaps 34g2, but reaches the short distance reflection surface 34a, the long distance reflection surface 34b and farthest distance reflection surface 34c. The gaps 34g1 and gaps 34g2 expand in the vertical direction from the front end to the back end.

As shown in FIG. 1 and FIG. 2, the four first reflectors 24 configuring the first lamp unit 20 and the three second reflectors 34 configuring the second lamp unit 30 are integrally formed as a continuous reflector body 16. The continuous reflector body 16 is supported on a lamp body 12 by a pair of left and right side wall portions 16a.

The continuous reflector body 16 has an upper wall portion 16b at the upper end of the four first reflectors 24 and the three second reflectors 34. The upper wall portion 16b extends along the vehicle width direction in a horizontal plane and supports the substrate 50 on an upper surface thereof. At the center of each of the first reflectors 24 and each of the second reflectors 34 on the upper wall portion 16b along the vehicle width direction, a rectangular-shaped opening portion 16c is formed in order to avoid interference with each of the first light sources 22 and each of the second light sources 32 mounted on the substrate 50.

Next, the configuration of the third lamp unit 40 will be described.

The third lamp unit 40 is arranged on the back side of the second lamp unit 30.

The third lamp unit 40 includes three third lamp sources 42, and three reflectors 44 which reflect light emitted respectively from the three third lamp sources 42 towards the front of the vehicle.

The three third light sources 42 are arranged at equal intervals along the vehicle width direction such that the closer they are to the vehicle width outer side, the more they are slightly displaced in the back side. The three third light sources 42 have the same configuration.

Each of the three third light sources 42 is a light emitting element (specifically, a white light emitting diode) having a light emitting surface 42*a* with a rectangular shape (i.e. square) and is mounted on the substrate 50 common with the four first light sources 22 and the three second light sources 32 such that the light emitting surface 42*a* faces downward. Each of the third light sources 42 is configured by a light emitting element whose output power is smaller than each of the first light sources 22 and each of the second light sources 32.

The three third reflectors 44 are arranged in parallel on the lower side of each of the three third light sources 42 in the vehicle width direction such that the closer they are to the vehicle width outer side, the more they are slightly displaced in the back side. Each of the third reflectors 44 has the same outer shape in the front view of the vehicle lamp.

As shown in FIG. 3, each of the third reflectors 44 has an upper reflection surface 44*a* and a lower reflection surface 44*b* as reflection surfaces. These upper reflection surface 44*a* and lower reflection surface 44*b* are configured by a plurality of reflection elements 44*s*. The plurality of reflection elements 44*s* control the light emitted from the third light sources 42 to be reflected towards the front of the vehicle.

The upper reflection surface 44*a* has a vertical sectional shape of a substantial ellipse with a first focal point at the light emitting center of light emitting surface 42*a* of the third light sources 42 and a second focal point at a point near the front end of the gap 34*g*1 positioned at the second reflector 34. The plurality of reflection elements 44*s* configuring the upper reflection surface 44*a* reflect light emitted from the third light sources 42 towards the gap 34*g*1 of the second reflector 34 as converged light in the vertical plane to be irradiated towards the front of the vehicle as widely diffused light from the gaps 34*g*1 in the vertical direction.

The lower reflection surface 44*b* has a vertical sectional shape of a substantial ellipse with a first focal point at the light emitting center of light emitting surface 42*a* of the third light sources 42 and a second focal point at a point near the from end of the gap 34*g*2 positioned at the second reflector 34. The plurality of the reflection elements 44*s* configuring the upper reflection surface 44*b* reflect light emitted from the third light sources 42 towards the gap 34*g*2 of the second reflector 34 as converged light in the vertical plane to be irradiated towards the front of the vehicle as widely diffused light from the gap 34*g*2 in the vertical direction.

Three third reflectors 44 are integrally formed as a continuous reflector body 18.

The continuous reflector body 18 has side wall portions 18*a* at left and right ends thereof and is supported on the light body 12 by a pair of left and right side wall portions 18*a*.

The continuous reflector body 18 has an upper wall portion 18*b* at the upper end of the three reflectors 44. The upper wall portion 18*b* extends along the vehicle width direction in a horizontal plane and supports the substrate 50 on an upper surface thereof. At the center of each of the third reflectors 64 on the upper wall portion 18*b* along the vehicle width direction, a rectangular-shaped opening portion 18*c* is formed in order to avoid interference with each of the third light sources 42 mounted on the substrate 50.

Figure 4A:
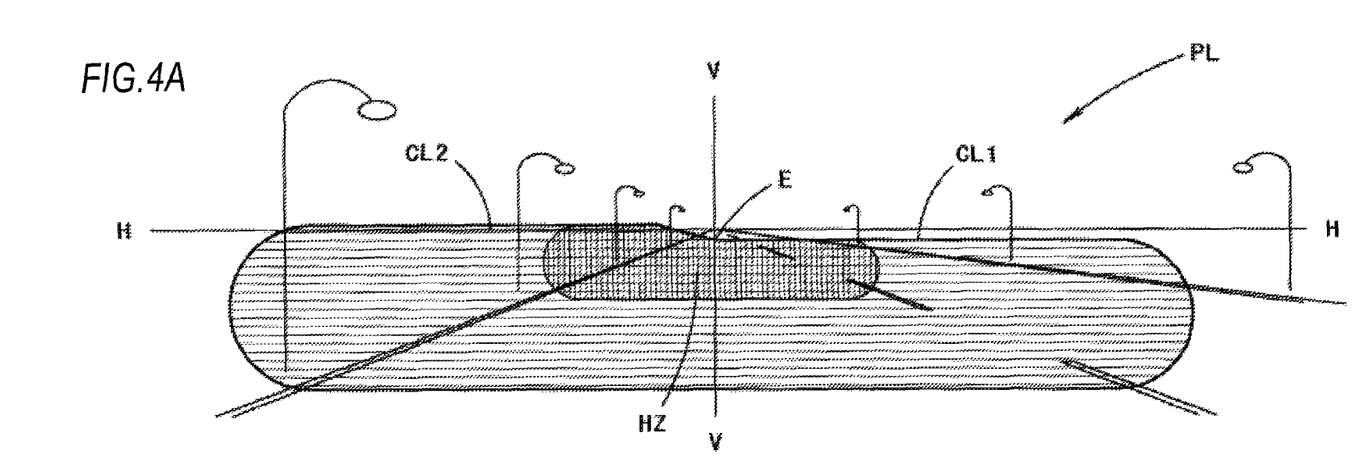
FIG. 4A is a view showing a low beam light distribution pattern.
Figure 4B:
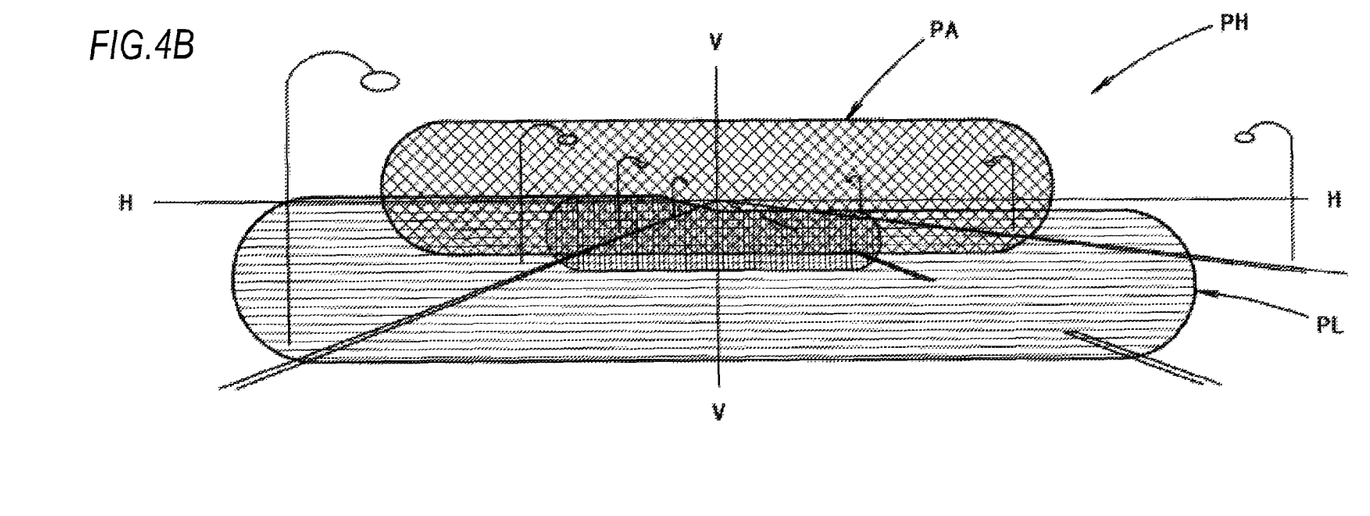
FIG. 4B is a view showing a high beam light distribution pattern.

FIGS. 4A and 4B are views showing light distribution patterns formed on an imaginary vertical screen provided at 25 m ahead of the vehicle by light irradiated from the vehicle lamp 10 towards the front of the vehicle. Specifically, the light distribution pattern shown in FIG. 4A is a low beam light distribution pattern PL, and the light distribution pattern shown in FIG. 4B is a high beam light distribution pattern PH.

The low beam light distribution pattern PL shown in FIG. 4A is formed by synthesizing four light distribution patterns formed by irritation light of the four sets of the second light sources 22 and the second reflector 34 configuring the first lamp unit 20.

The low beam light distribution pattern PL is a left light distribution pattern and has cutoff lines CL1 and CL2 on the upper end thereof which are different in height between left and right. The cutoff lines CL1 and CL2 extend along a horizontal direction at different height between left and right with a V-V line which crosses a vanishing point (i.e. H-V) of the light front direction and extends along the vertical direction as a boundary. An oncoming lane side portion at the right side of the V-V line is formed as a lower cutoff line CL1, and an ongoing lane side portion at the left side of the V-V line is formed as an upper cutoff line CL2 which rises from the lower cutoff line CL1 via a slope portion.

In the low beam light distribution pattern PL, an intersection point (i.e. an elbow point E) of the lower cutoff line CL1 and the V-V line is positioned at about 0.5~0.6 degree downward the H-V. In the low beam light distribution pattern PL, the high luminous intensity area (i.e. a hot zone) HZ is at the periphery of the elbow point E.

On the other hand, the high beam light distribution pattern PH shown in FIG. 4B is formed as a synthesized light distribution pattern of the low beam light distribution pattern PL and the additional light distribution pattern PA.

The additional light distribution pattern PA is formed by synthesizing three light distribution patterns formed by irritation light of the three sets of the second light sources 32 and the second reflector 34 configuring the second lamp unit 30. The light distribution pattern PA is formed as a wide light distribution pattern which extends towards the left and right sides with a point slightly higher than the H-V as a center to vertically across the cutoff lines CL1 and CL2.

In the present embodiment, each of the third light sources 42 configuring the third lamp unit 40 is lit in the low beam irradiation mode. However, since each of the third light sources 42 is configured by a light emitting element whose output power is smaller than each of the first light sources 22 and each of the second light sources 32, and each of the third reflectors 44 configuring the third lamp unit 40 reflects the light emitted from each of the third light sources 42 towards gaps 34*g*1 and 34*g*2 as converged light, irritation light from the third lamp unit 40 becomes weak light which is largely diffused from the gaps 34*g*1 and 34*g*2 towards the front of the vehicle in the vertical direction. Therefore, light intensity which contributes to form the low beam light distribution pattern PL is not ensured, and light intensity of the glare provided for an oncoming vehicle driver is not ensured.

Figure 5A:
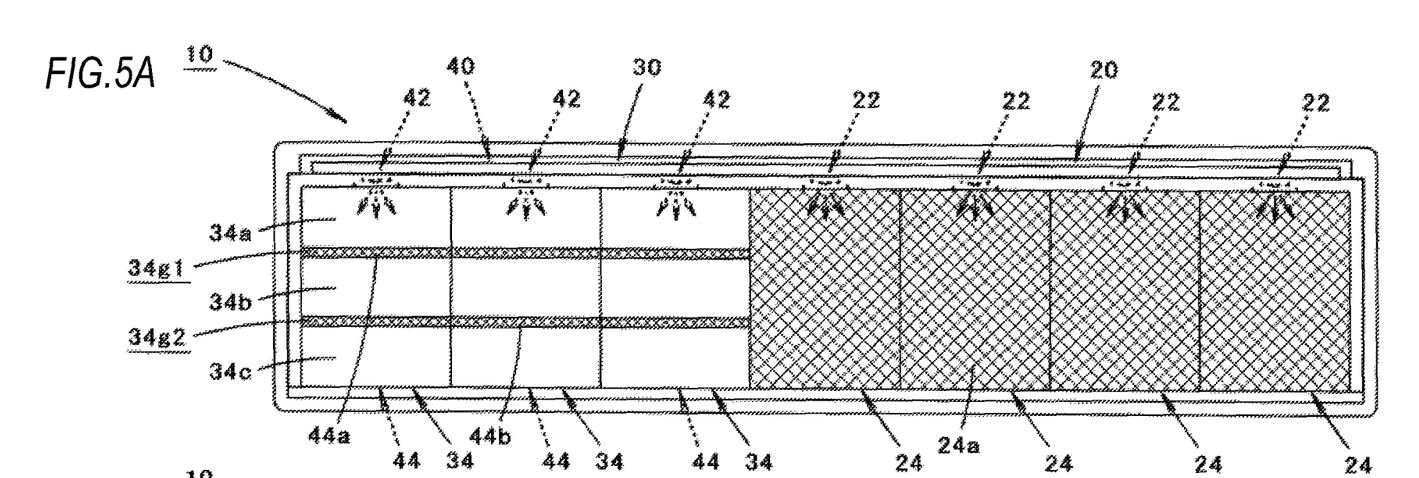
FIG. 5A is a view showing a lighting state in a low beam irradiation mode.
Figure 5B:
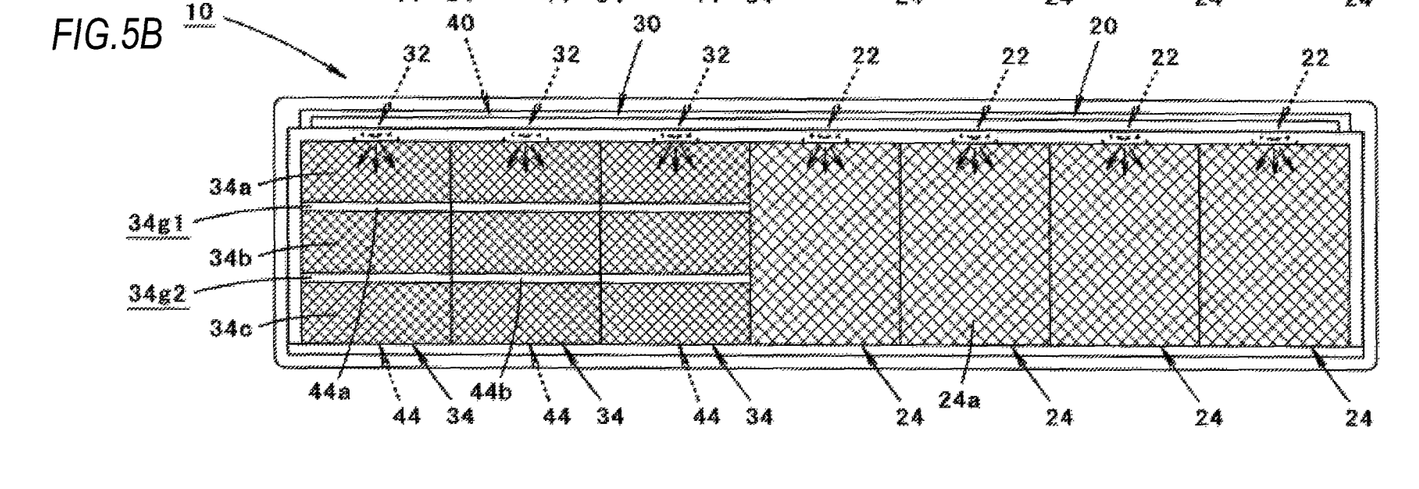
FIG. 5B is a view showing a lighting state in a high beam irradiation mode.

FIGS. 5A and 5B are front views showing the vehicle lamp 10 in a lighting state.

Specifically, FIG. 5A shows a lighting state in a low beam irradiation mode, and FIG. 5B shows a lighting state in a high beam irradiation mode, As shown in FIG. 5A, the four first light sources 22 configuring the first lamp unit 20 are lit in the low beam irradiation mode. Therefore, the reflection surface 24*a* (the areas represented by grid lines) of the four first reflectors 24 configuring the first lamp unit 20 appears to emit light.

The three third light sources 42 configuring the third lamp unit 40 are also lit in the low beam irradiation mode. Therefore, the upper reflection surface 44a and the lower reflection surface 44b of the three third reflectors 44 configuring the third lamp unit 40 appear to emit light through the gaps 34g1 and 34g2 (the areas represented by grid lines) of the second reflector 34. In this case, the gaps 34g1 and 34g2 at upper and lower positions are continuously formed across the three second reflectors 34, and therefore, a part of the second lamp unit 30 appears to emit emitting in a band shape.

On the other hand, as shown in FIG. 5B, the three second light sources 32 configuring the second lamp unit 30 are lit and the three third light sources 42 configuring the third lamp unit 40 are turned off in the high beam irradiation mode. Therefore, the short distance reflection surface 34a, the long distance reflection surface 34b and the farthest reflection surface 34c (the areas represented by grid lines) of the three second reflectors 34 configuring the second lamp unit 30 appear to emit light, and the gaps 34g1 and 34g2 at upper and lower positions therebetween do not appear to emit light.

The four first light sources 20 configuring the first lamp unit 20 maintain the lighting state in the high beam irradiation mode, and therefore, the reflection surface 24a of the four first reflectors 24 configuring the first lamp unit 20 appears to emit light.

Next, the effects of the present embodiment will be described.

The vehicle lamp 10 according to the present embodiment is configured to form the low beam light distribution pattern PL by the first light sources 22 and the first reflectors 24, and form the high beam additional light distribution pattern PA by the second light sources 32 and the second reflectors 34. Each of the second reflectors 34 for a high beam includes the short distance reflection surface 34a provided at the closer position, the long distance reflection surface 34b provided at the farther position, and the farthest distance reflection surface 34c provided at the farthest position with respect to the corresponding second light source 32 at the predetermined intervals therebetween, and the third light sources 42 and the third reflectors 44 are arranged at a back side of the second reflectors 34. The third reflectors 44 reflect the light emitted from the third light sources 42 towards the front of the vehicle through the gap 34g1 between the short distance reflection surface 34a and the long distance reflection surface 34b, and the gap 34g2 between the long distance reflection surface 34b and the farthest distance reflection surface 34c. The third light sources 42 are configured to be lit in the low beam irradiation mode, so that the following effects can be obtained.

That is, the third light sources 42 are lit in the low beam irradiation mode, it is possible that the gap 34g1 between the short distance reflection surface 34a and the long distance reflection surface 34b, and the gap 34g2 between the long distance reflection surface 34b and the farthest distance reflection surface 34c appear to emit light by reflection light of the upper reflection surface 44a and the lower reflection surface 44b from the third reflectors 44. Accordingly, the gaps 34g1 and 34g2 at the upper and lower positions can be made to emit light in a horizontally long band shape, so that the visibility of the vehicle lamp 10 can be improved.

According to the present embodiment, in the vehicle lamp which is configured to selectively perform low beam irradiation and high beam irradiation by reflecting light from the first light sources 22 and the second light sources 32 towards the front of the vehicle by the first reflectors 24 and the second reflectors 34, the visibility in the low beam irradiation mode can be improved.

Further, in the present embodiment, when the second light sources 32 are lit, the gaps between the short distance reflection surface 34a provided at the closer position, the long distance reflection surface 34b provided at the farther position and the farthest distance reflection surface 34c provided at the farthest position of the second reflectors 34 appear to emit light at predetermined intervals, so that the visibility of the vehicle lamp 10 in the high beam irradiation mode will not be damaged.

Further, in the present embodiment, the upper reflection surface 44a and the lower reflection surface 44b of the third reflectors 44 reflect the light emitted from the third light sources 42 as converged light towards the gaps 34g1 and 34g2 in the vertical plane, so that the utilization efficiency of irradiation light from the third light sources 42 and the third reflectors 44 can be improved without requiring expansion of the gaps 34g1 and 34g2.

Further, each of the gaps 34g1 and 34g2 is formed to expand in the vertical direction from the front end to the back end, so that the utilization efficiency of the irradiation light from the third light sources 42 and the third reflectors 44 can be further improved.

In the present embodiment, the second reflectors 34 are arranged on the lower side of the second light sources 32, and the short distance reflection surface 34a, the long distance reflection surface 34b, and the farthest distance reflection surface 34c respectively have the vertical sectional shape formed based on the parabolas P1, P2 and P3 as reference lines, so that the expanding of the reflection light respectively from the short distance reflection surface 34a, the long distance reflection surface 34b, and the farthest distance reflection surface 34c in the vertical direction can be suppressed to be smaller. Accordingly, it is possible to prevent a vertical width of the high beam additional light distribution pattern PA from being too large.

The focal distance of the parabola P2 configuring the reference line of the vertical sectional shape of the long distance reflection interface 34b is set to be larger than that of the focal distance of the parabola P1 configuring the reference line of the vertical sectional shape of the short distance reflection interface 34a, and the focal distance of the parabola P3 configuring the reference line of the vertical sectional shape of the farthest distance reflection interface 34c is set to be larger than that of the focal distance of the parabola P2 configuring the reference line of the vertical sectional shape of the long distance reflection interface 34b, so that the light from the second light sources 32 can hardly reach the gaps 34g1 and 34g2, but reach the short distance reflection surface 34a, the long distance reflection surface 34b, or the farthest distance reflection interface 34c easily.

In the present embodiment, the three sets of the second light sources 32 and the second reflectors 34 are arranged in parallel along the vehicle width direction, so that a brighter high beam additional light distribution pattern PA with less light distribution unevenness can be formed. In addition, the three sets of the third light sources 42 and the second reflectors 44 are also arranged in parallel along the vehicle width direction, so that the gaps 34g1 and 34g2 appear to emit light substantially uniformly.

In the present embodiment, the four sets of the first light sources 22 and the first reflectors 24 are arranged in parallel along the vehicle width direction, so that a brighter low beam light distribution pattern PL with less light distribution unevenness can be formed.

In the present embodiment, the four first light sources 22, the three second light sources 32 and the three third light sources 42 are all configured by the light emitting elements and are mounted on the same substrate 50, so that they can be arranged in a smaller space with better precision.

Each of the third light sources 42 is configured by the light emitting elements whose output power is smaller than each of the first light sources 22 and each of the second light sources 32, so that the above effects can be obtained by the smaller power.

In the present embodiment, it has been described that the gaps 34g1 and 34g2 at upper and lower positions are formed continuously at a constant vertical width across the three second reflectors 34, but the vertical widths of the gaps 34g1 and 34g2 may be changed in accordance with the position in the vehicle width direction, and the gaps 34g1 and 34g2 may be formed at multiple positions in the vehicle width direction.

In the present embodiment, it has been described that the gaps 34g1 and 34g2 are formed at the upper and lower positions of each of the three second reflectors 34, but the gaps 34g1 and 34g2 may be formed at one or more than two positions.

In the present embodiment, the three third light sources 42 configuring the third lamp unit 40 are turned off in the high beam irradiation mode. However, the three third light sources 42 may maintain the lighting state in the high beam irradiation mode.

In the present embodiment, it has been described that the first lamp unit 20 includes the four sets of the first light sources 22 and the first reflectors 24, but less than or more than four sets may be included.

In the present embodiment, it has been described that the second lamp unit 30 includes the three sets of the second light sources 32 and the second reflectors 34, but less than or more than three sets may be included.

In the present embodiment, it has been described that the third lamp unit 40 includes three sets of the third light sources 42 and the third reflectors 44, but less than or more than three sets may be included.

In the present embodiment, it has been described that the second reflectors 34 are arranged at the lower side of the second light sources 32, and the third reflectors 44 are arranged at the lower side of the third light sources 42, but these reflectors may be arranged at sides other than the lower side (such as, the upper side or the lateral side).

In the present embodiment, it has been described that the second lamp unit 30 is arranged adjacent to the first lamp unit 20 in the vehicle width inner side, but the second lamp unit 30 may be arranged adjacent to the first lamp unit 20 in the vehicle width outer side or adjacent to the upper or lower side of the first lamp unit 20.

In the present embodiment, a specific light distribution pattern is not formed by the irradiation light from the third lamp unit 40. But a light distribution pattern for a position lamp, a light distribution pattern for a daytime running lamp, or a light distribution pattern strengthening the brightness of a low beam light distribution pattern and the like may be formed by the irradiation light from the third lamp unit 40. In this case, light emitting elements having output power equal to each of the first light sources 22 and each of the second light sources 32 may be used in each of the third light sources 42.

Next, modifications of the embodiment will be described.

Figure 6A:
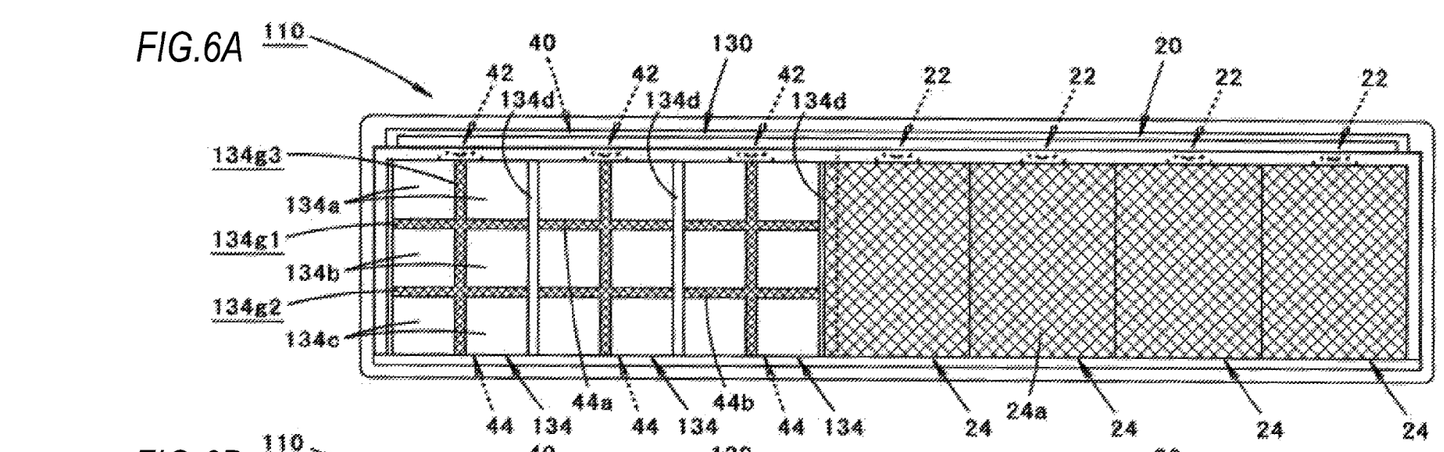
FIGS. 6A and 6B are views showing a modification of the embodiment and correspond to FIGS. 5A and 5B.
Figure 6B:
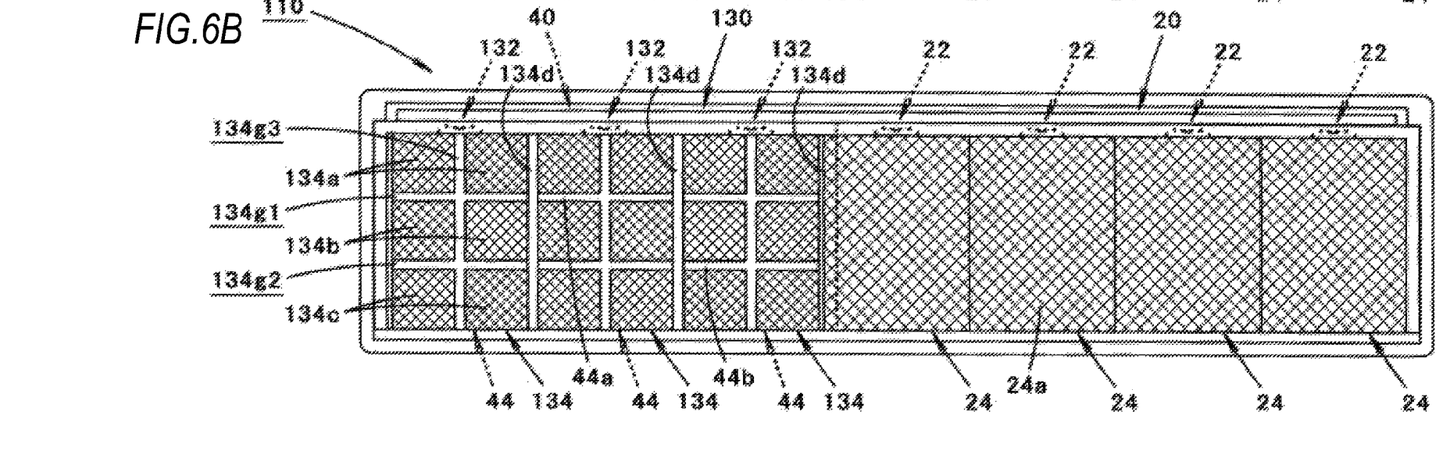

FIGS. 6A and 6B are views showing a vehicle lamp 110 according to a modification in a lighting state and correspond to FIGS. 5A and 5B.

As shown in FIGS. 6A and 6B, the basic configuration of the vehicle lamp 110 is similar to that of the vehicle lamp 10 in the above-described embodiment, except that the configuration of each second reflector 134 of a second lamp unit 130 is partly different from that of the above-described embodiment.

That is, each second reflector 134 according to the modification is configured such that a short distance reflection surface 134a, a long distance reflection surface 134b and a farthest distance reflection surface 134c are further divided into left and right respectively, so as to form a vertically extending gap 134g3, crossing a gap 134g1 between the short distance reflection surface 134a and the long distance reflection surface 134b, and a gap 134g2 between the long distance reflection surface 134b and the farthest distance reflection surface 134c.

To achieve such configuration, each second reflector 134 of the modification is configured by being separated by partition walls 134d formed on left and right sides thereof.

As shown in FIG. 6A, four first light sources 22 configuring a first lamp unit 20 are lit in a low beam irradiation mode. Therefore, a reflection surface 24a (the areas represented by grid lines) of the four first reflectors 24 configuring the first lamp unit 20 appears to emit light.

Further, three third light sources 42 configuring a third lamp unit 40 are also lit in the low beam irradiation mode. Therefore, an upper reflection surface 44a and a lower reflection surface 44b of three reflectors 44 configuring the third lamp unit 40 appears to emit light through the gaps 134g1, 134g2 and 134g3 of the second reflectors 134.

On the other hand, as shown in FIG. 6B, three second light sources 132 configuring a second lamp unit 130 are lit in a high beam irradiation mode, while the three light sources 42 configuring the third lamp unit 40 are turned off. Therefore, the short distance reflection surface 134a, the long distance reflection surface 134b and the farthest distance reflection surface 134c (the areas represented by grid lines) corresponding to the three second light sources 132 configuring the second lamp unit 130 appear to emit light, while the upper and lower gaps 134g1, 134g2 and the vertically central gap 134g3 do not appear to emit light.

Four first light sources 22 configuring the first lamp unit 20 maintain a lighting state in the high beam irradiation mode, and therefore, the reflection surface 24a (the areas represented by grid lines) of the four first reflectors 24 configuring the first lamp unit 20 also appears to emit light.

As described in the modification, the upper and lower gaps 134g1 and 134g2 of each second reflector 134 emit light in a horizontally long band shape, while the vertically central gaps 134g3 emit light in a longitudinally long band shape, so that the visibility of the vehicle lamp 10 is further improved.

In the modification, the upper reflection surface 44a and the lower reflection surface 44b of third reflectors 44 are also configured to reflect the light emitted from the third light sources 42 as converged light towards the gaps 134g1 and 134g2 in the vertical plane. Thus the utilization efficiency of irradiation light from the third light sources 42 and the third reflectors 44 can be improved without requiring expansion of the gaps 134g1 and 134g2.

In the modification, the upper reflection surface 44a and the lower reflection surface 44b of third reflectors 44 may be configured to reflect the light emitted from the third light sources 42 as converged light towards the gaps 134g3 in the horizontal plane. Thus, such a configuration can make the gaps 134g3 appear to emit light at the same brightness as that of gaps 134g1 and 134g2.

Incidentally, values represented as various elements in the embodiment and modification thereof are only for illustrative purpose, and can appropriately be set as other values.

The present invention is not limited to the configurations in the embodiment and modification, and other modified configurations can be applied.

What is claimed is:

1. A vehicle lamp comprising:
   a first light source;
   a first reflector which is configured to reflect light emitted from the first light source towards a front of a vehicle to form a low beam light distribution pattern;
   a second light source;
   a second reflector which is configured to reflect light emitted from the second light source towards the front of the vehicle to form a high beam additional light distribution pattern, the second reflector including a short distance reflection surface provided at a closer position and a long distance reflection surface provided at a farther position with respect to the second light source at a predetermined interval therebetween,
   a third light source which is arranged at a back side of the second reflector; and
   a third reflector which is arranged at the back side of the second reflector and configured to reflect light emitted from the third light source towards the front of the vehicle through a gap between the short distance reflection surface and the long distance reflection surface,
   wherein the third light source is configured to be lit in a low beam irradiation mode.

2. The vehicle lamp according to claim 1,
   wherein a reflection surface of the third reflector is configured to reflect the light emitted from the third light source as converged light towards the gap.

3. The vehicle lamp according to claim 1,
   wherein the second reflector is arranged on an upper side or a lower side of the second light source,
   wherein each of the short distance reflection surface and the long distance reflection surface has a vertical sectional shape formed based on a parabola as a reference line, and
   wherein a focal distance of the parabola configuring the reference line of the vertical sectional shape of the long distance reflection surface is set to be larger than a focal distance of the parabola configuring the reference line of the vertical sectional shape of the short distance reflection surface.

4. The vehicle lamp according to claim 3,
   wherein multiple sets of second light sources and second reflectors are arranged in a vehicle width direction, and
   wherein multiple sets of third light sources and third reflectors are arranged in the vehicle width direction.

5. The vehicle lamp according to claim 4,
   wherein the second light sources and the third light sources are all configured by light emitting elements and are mounted on a same substrate.

* * * * *